United States Patent

Harder et al.

[11] Patent Number: 5,877,261
[45] Date of Patent: Mar. 2, 1999

[54] CROSSLINKING OF ACRYLATE HOT-MELT PRESSURE-SENSITIVE ADHESIVES

[75] Inventors: Christian Harder, Hamburg; Axel Burmeister, Buchholz; Christiop Nagel, Hamburg; Wolfgang Schacht, Neuwulmsdorf, all of Germany

[73] Assignee: Beiersdorf AG, Hamburg, Germany

[21] Appl. No.: 923,149

[22] Filed: Sep. 4, 1997

Related U.S. Application Data

[63] Continuation of Ser. No. 670,914, Jun. 26, 1996, abandoned.

[30] Foreign Application Priority Data

Jul. 4, 1995 [DE] Germany ................. 195 24 250.5

[51] Int. Cl.$^6$ ................. C08F 8/30; C08L 75/04
[52] U.S. Cl. ................. 525/123; 428/346; 428/355; 525/374; 528/44; 522/150
[58] Field of Search ................. 525/123, 374; 528/44

[56] References Cited

U.S. PATENT DOCUMENTS

| | | |
|---|---|---|
| 4,524,104 | 6/1985 | Hagio et al. . |
| 4,699,824 | 10/1987 | Pufaal ................. 428/220 |
| 5,034,269 | 7/1991 | Wheeler ................. 428/317.3 |
| 5,312,868 | 5/1994 | Abe ................. 525/124 |
| 5,338,819 | 8/1994 | Narayan ................. 528/60 |
| 5,416,127 | 5/1995 | Chandran ................. 522/149 |
| 5,470,945 | 11/1995 | Markle ................. 528/390 |

FOREIGN PATENT DOCUMENTS

| | | |
|---|---|---|
| 0 600 767 A1 | 6/1994 | European Pat. Off. . |
| 0 608 891 A1 | 8/1994 | European Pat. Off. . |
| 42 42 687 A1 | 6/1994 | Germany . |
| 2 185 988 | 8/1987 | United Kingdom . |

*Primary Examiner*—Fred Zitomer
*Attorney, Agent, or Firm*—Sprung Kramer Schaefer & Briscoe

[57] ABSTRACT

The use of isocyanates which are free from blocking agent for the chemical/thermal crosslinking of hot-melt pressure-sensitive acrylate adhesives (hot-melts).

14 Claims, No Drawings

CROSSLINKING OF ACRYLATE HOT-MELT PRESSURE-SENSITIVE ADHESIVES

This application is a continuation of application Ser. No. 08/670,914, filed on Jun. 26, 1996, now abandoned.

Crosslinking of acrylate hot-melt pressure-sensitive adhesives

The invention relates to the crosslinking of acrylate hot-melt pressure-sensitive adhesives and to corresponding hotmelt products.

Unless an additional crosslinking step is interposed, after coating, the known acrylate hot-melt pressure-sensitive adhesives possess, as is known, very poor adhesion properties, especially in relation to the shear strength of such products. The radiation-chemical crosslinking techniques (EBC, UV) employed to date require the presence of an appropriate technical and cost-intensive range of machinery. Furthermore, in the case of filled, coloured and thick coats, such techniques can only be employed under very limited conditions.

Moreover, the thermal-chemical crosslinking agents (e.g. chelates) known from the solvent acrylates cannot be transferred to acrylate hot-melt pressure-sensitive adhesives.

However, U.S. Pat. No. 4,524,104 has already disclosed acrylate hot-melt pressure-sensitive adhesives which can be crosslinked using blocked polyisocyanates together with cycloamidines or salts thereof as catalyst. Possible disadvantages of such products for the adhesive proper- ties are, on the one hand, the catalyst required, but in particular the blocking agent which is liberated in the course of crosslinking. The HCN, phenol, caprolactam or the like which is formed must, in addition, be suctioned off and removed, with the corresponding outlay.

The object of this invention was to remedy this situation in order to bring about further combination of the advantages of acrylate hot-melt pressure-sensitive adhesives with those of the chemically-thermally cross-linkable solvent compositions, i.e. to prepare thermally stable, UV-resistant and substantially solvent-resistant products in the absence of solvent at the high production rates known for 100% systems.

This object is achieved as characterized in more detail in the patent claims, with the advantage that formulations compiled and technical experience gained in solvent systems can be transferred directly to the 100% systems; and with the further advantage that no blocking agents are liberated, and yet processing at elevated temperature in 100% acrylate systems is ensured.

In this context, relative to the previously known instances of crosslinking with blocked polyisocyanates and cycloamidine, there is the further advantage of reducing the process by one step, namely the encapsulation, and the possibility of carrying out crosslinking at a low temperature, which is particularly important in the case of sensitive carrier materials.

Acrylate hot-melt pressure-sensitive adhesives which are employed in accordance with the invention can, with no restrictions, be the products of this type which are known, and which owing to the desired adhesive properties in any case generally contain, incorporated by polymerization in the copolymer, small proportions of acrylic acid and/or other monomers containing functional groups. Such copolymers are therefore NCO-reactive, especially by means of functional groups such as COOH, OH, $NH_2$, NH, $CONH_2$ and SH, and if appropriate NCO itself. Thus it is possible, in particular, for acrylic acid, hydroxy (meth)acrylates and/or amino-and/or imino-containing acrylates to be copolymerized. In this context, particular preference is given to acrylate copolymers containing from 0.1 to 40% by weight, in particular from 2 to 20% by weight, of NCO-reactive monomers in copolymerized form, especially acrylic acid, maleic anhydride, N-tert-butylacrylamide and/or 2-hydroxypropyl acrylate.

As isocyanates which are free from blocking agent it is possible in accordance with the invention, in particular, to employ sterically hindered or dimerized isocyanates, with the great advantage that, while excellent crosslinking results are obtained, no blocking agents are liberated. Moreover, the dimerized isocyanates have the advantage that because of the relatively high crosslinking temperatures required it is possible to incorporate the isocyanate simply into the compositions in a compounder. Furthermore, there are advantages in the coating process.

In terms of the reaction temperature and reaction time, all isocyanates can in principle be controlled by means of known accelerators. An alternative possibility is to achieve crosslinking by way of polyols, using the same crosslinking principle, by means of the copolymerization of NCO-containing monomers.

In order to improve their adhesive properties, the compositions can be blended both with the customary adhesive resins (% by weight 5–70) and with other reactive components containing OH, COOH and/or $NH_2$ groups, for example polyetherols/polyesterols (% by weight 5–70).

An example of a sterically hindered isocyanate is the TMXDI® teramethylenexylene disocyanate product from Cyanamid; an example of a dimerized isocyanate is Desmodur isocycante TT® toluene diisocycanate dimer from Bayer AG.

Correspondingly prepared compositions can be employed as an aftercoat or viscoelastic carrier coat.

Where compositions containing acrylic acid are employed, foaming (aftercoat/carrier with the advantage of a reduced consumption of composition) is possible.

Owing to the isocyanate crosslinking, moreover, it is possible, especially in the case of filled/coloured compositions, to achieve markedly higher degrees of crosslinking than by radiation-chemical crosslinking.

According to the invention, the combination of radiation-chemical precrosslinking of the products, which enables greater simplicity of handling, with the corresponding after-crosslinking potential of the isocyanates opens up the way to new products, for example to new safety labels, engine identifications, etc. These can be fixed using precrosslinking by means of EB or UV, and then isocyanate crosslinking can be initiated by heating in order, for example, to prevent redetachability. The adhesive data show outstanding values.

Moreover, the compositions can be employed in unfilled form or else can also be blended, in addition, with fillers (carbon black, $TiO_2$, solid or hollow glass balls, microballs or nucleating agents such as Aerosil R 972, etc.).

EXAMPLES

Polymerization of the composition

The following monomer mixtures (quantities in % by weight) were copolymerized in solution. The polymerization batches comprise 60% by weight of the monomer mixtures and 40% by weight of solvents (such as petroleum spirit 60/95 and acetone). In customary reaction vessels made of glass or steel (with reflux condenser, stirrer, thermometer unit and gas inlet pipe), the solutions were first of all freed from oxygen by flushing with nitrogen and were then heated to boiling.

Polymerization was initiated by the addition of from 0.2 to 0.4% by weight of a customary free-radical polymerization initiator, such as dibenzoyl peroxide, dilauroyl peroxide or azobisisobutyronitrile. During the polymerization period of about 20 hours the mixture was diluted depending on its viscosity, several times if necessary, with additional solvent, such that the finished polymer solutions had a solids content from 35 to 55% by weight.

Composition blending and concentration

Depending on the formulation and nature of the filler, blending was carried out either before or after concentration in apparatus appropriate for this. Concentration is accomplished by lowering the pressure and raising the temperature.

Formulations

Example 1 adhesive composition (to be used as aftercoat): 2-ethylhexyl acrylate/n-butyl acrylate/2-hydroxypropyl acrylate/maleic anhydride 30/60/6/3 (% by weight) or 2-ethylhexyl acrylate/n-butyl acrylate/acrylic acid/maleic anhydride 30/60/6/3 crosslinked with 0.4% by weight Desmodur TT at 90° C. for 14 days adhesive properties and shear test give outstanding values

Example 2 acrylate-based carrier coat n-butyl acrylate/N-tert-butylacrylamide/2-hydroxypropyl acrylate 80/14/6 (% by weight)

blended with 30% by weight solid glass balls, crosslinked with 3% Desmodur TT at 90° C. for 14 days adhesive properties (after coating of the carrier coat with aftercoat on both sides) and shear test give outstanding values

Example 3 foamed adhesive composition: n-butyl acrylate/N-tert-butylacrylamide/2-hydroxypropyl acrylate 80/14/6 (% by weight)

blended with 30% by weight solid glass balls, 3% by weight IPDI 1540, 0.05% by weight DBTL, 7.5% by weight Aerosil R 972 crosslinked at 170° C. for 15 minutes degree of foaming: 130%.

Processing

Coating took place on units suitable for this purpose, the temperature and rate of coating being harmonized with the concentration and properties of the crosslinking agents and catalysts.

We claim:

1. In the chemical/thermal crosslinking of an acrylate hot-melt pressure-sensitive adhesive crosslinkable with an isocyanate, the improvement which comprises effecting the crosslinking in the presence of at least one of a non-blocked sterically hindered isocyanate or a non-blocked isocyanate dimer which does not exhibit crosslinking action under mixing and hot-melt application conditions but which crosslinks under the application of chemical/thermal stimuli effective to crosslink the isocyanate crosslinkable acrylate with the non-blocked isocyanate.

2. The method according to claim 1, wherein the acrylate hot-melt pressure sensitive adhesive is a copolymer having NCO-reactive functional groups.

3. The method according to claim 1, wherein the acrylate hot-melt pressure sensitive adhesive is present in an amount of from 20 to 99% by weight and the isocyanate is present in an amount of from 80 to 0.1% by weight.

4. The method according to claim 1, wherein the acrylate hot-melt pressure sensitive adhesive is present in an amount of from 40 to 97% by weight and the isocyanate is present in an amount of from 3 to 60% by weight.

5. The method according to claim 1, wherein crosslinking is effected by electron beam or UV radiation prior to chemical/thermal crosslinking.

6. The method according to claim 1, wherein the hot-melt pressure sensitive adhesive additionally contains at least one of a filler, blowing agent, hollow balls or a compounding agent.

7. The method according to claim 1, wherein the adhesive and isocyanate are on a carrier film for an adhesive tape when crosslinked.

8. The method according to claim 4, wherein the isocyanate is sterically hindered or is dimerized, the acrylate hot-melt pressure sensitive adhesive is a copolymer having NCO-reactive functional groups, crosslinking by electron beam or UV radiation is effected prior to the chemical/thermal crosslinking, the hot-melt pressure sensitive adhesive is present in an amount of from 40 to 97% by weight and the isocyanate is present in an amount of from 60 to 3% by weight based on the combined weight of the adhesive and the isocyanate, the adhesive and isocyanate being on a carrier film for an adhesive tape when crosslinked.

9. The method according to claim 2, wherein the NCO-reactive functional groups are selected from the group consisting of COOH, OH, $NH_2$, $CONH_2$, SH and NCO.

10. The method according to claim 1, wherein the acrylate is a copolymer prepared with monomers selected from the group consisting of acrylic acid, hydroxy (meth) acrylates, amino-containing acrylates, imino-containing acrylates, alkylacrylamides and maleic anhydride.

11. The method according to claim 1, wherein the acrylate contains from 0.1 to 40% by weight of NCO reactive monomers and copolymerized therein.

12. The method according to claim 11, wherein the acrylate contains from 2 to 20% by weight of NCO reactive monomers.

13. A method for crosslinking an acrylate hot-melt pressure sensitive adhesive having isocyanate reactive functional groups with a non-blocked isocyanate which comprises applying the acrylate hot-melt adhesive in a molten condition to a substrate, said adhesive containing a non-blocked sterically hindered isocyanate and/or a non-blocked isocyanate dimer which does not exhibit crosslinking action under mixing and hot-melt application conditions of the acrylate hot-melt adhesive, and crosslinking the acrylate under the application of chemical and/or thermal stimuli effective to crosslink the crosslinkable acrylate with the said non-blocked isocyanate subsequent to application.

14. In the chemical/thermal crosslinking of an acrylate hot-melt pressure-sensitive adhesive crosslinkable with an isocyanate, the improvement which comprises effecting the crosslinking in the presence of a non-blocked isocyanate which does not exhibit crosslinking action under mixing and hot-melt application conditions but which isocyanate does crosslink said adhesive under the application of chemical/thermal stimuli effective to crosslink the isocyanate crosslinkable acrylate with the non-blocked isocyanate subsequent to application.

* * * * *